United States Patent
Underwood

(10) Patent No.: US 8,868,649 B2
(45) Date of Patent: Oct. 21, 2014

(54) BROADCASTING EVENTS AFFECTING PUBLIC SAFETY

(75) Inventor: Rosa M. Underwood, Washington, DC (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 508 days.

(21) Appl. No.: 12/782,463

(22) Filed: May 18, 2010

(65) Prior Publication Data

US 2011/0289144 A1 Nov. 24, 2011

(51) Int. Cl.
*G06F 15/16* (2006.01)
*H04L 12/18* (2006.01)

(52) U.S. Cl.
CPC ........ *H04L 12/1845* (2013.01); *H04L 12/1895* (2013.01)
USPC .......................................................... 709/204

(58) Field of Classification Search
None
See application file for complete search history.

(56) References Cited

U.S. PATENT DOCUMENTS

| | | | | |
|---|---|---|---|---|
| 8,200,762 B2* | 6/2012 | Staats | ............................ | 709/206 |
| 8,225,219 B2* | 7/2012 | Edelen et al. | .................. | 715/753 |
| 2006/0206568 A1* | 9/2006 | Verma et al. | ................... | 709/206 |
| 2006/0259580 A1* | 11/2006 | Laberteaux et al. | .......... | 709/217 |
| 2007/0282956 A1* | 12/2007 | Staats | ............................ | 709/206 |
| 2009/0119678 A1* | 5/2009 | Shih et al. | ..................... | 719/313 |

* cited by examiner

*Primary Examiner* — Brian P Whipple

(57) ABSTRACT

A system includes a marker having a marker range. The marker is configured to receive a message from an operation center, wherein the message identifies an event associated with the marker range. A device is configured to receive the message from the marker in response to the device entering the marker range and determine whether to communicate that message by the device.

25 Claims, 7 Drawing Sheets

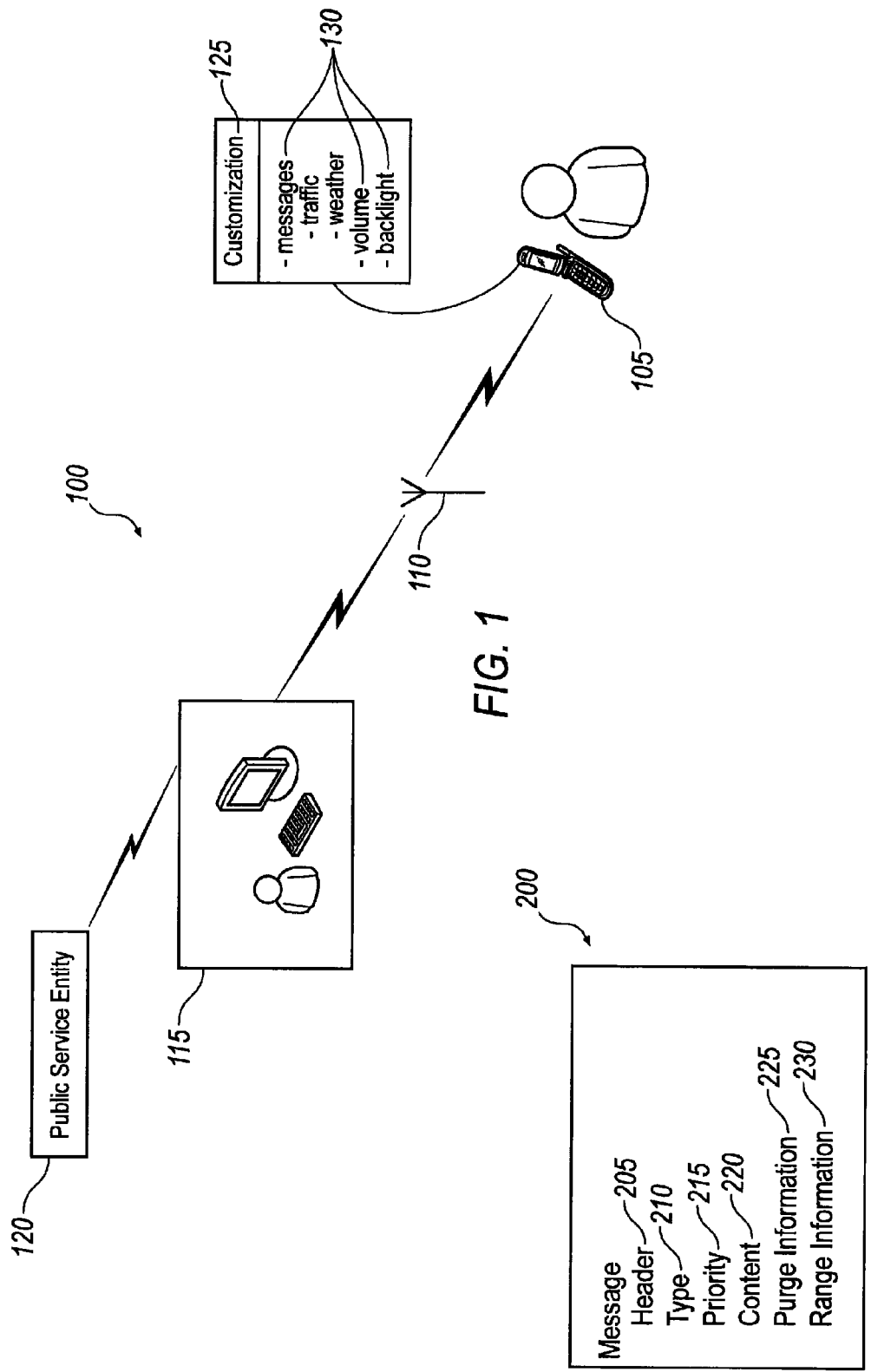

BROADCASTING EVENTS AFFECTING PUBLIC SAFETY

BACKGROUND

Public service entities such as weather centers, police departments, and departments of transportation often have important messages to convey to the public regarding matters of widespread potential interest such as those alerts involving hazards or conditions. Digital signs in public places are often used to advertise and inform viewers of these matters. Radio and television broadcast are also used to convey information to the public. However, these methods can be inadequate in informing the public of the hazard or condition. Information displayed on signs can sometimes be distracting to viewers. For example, in the case of signs located adjacent to roadways, traffic may be affected by drivers who must slow down to view the information associated with the sign. Stationary signs advertising for drivers to tune to a designated radio frequency for more information about the alert are often ineffective. Drivers are often hesitant to interrupt their current audio transmission to tune in for special alerts. Further, Emergency Broadcast System alerts are only heard when a broadcast system, such as a radio or television, is in use. Moreover, because broadcast regions sometime expand over large areas, some broadcasts alerts are irrelevant to many users within the broadcast region. Accordingly, a system that is able to transmit an alert or message to the public in an efficient and safe manner is needed.

BRIEF DESCRIPTION OF THE DRAWINGS

FIG. 1 illustrates an exemplary system including an operations center and a marker.

FIG. 2 illustrates an exemplary message including message data.

DETAILED DESCRIPTION

Figure 3:
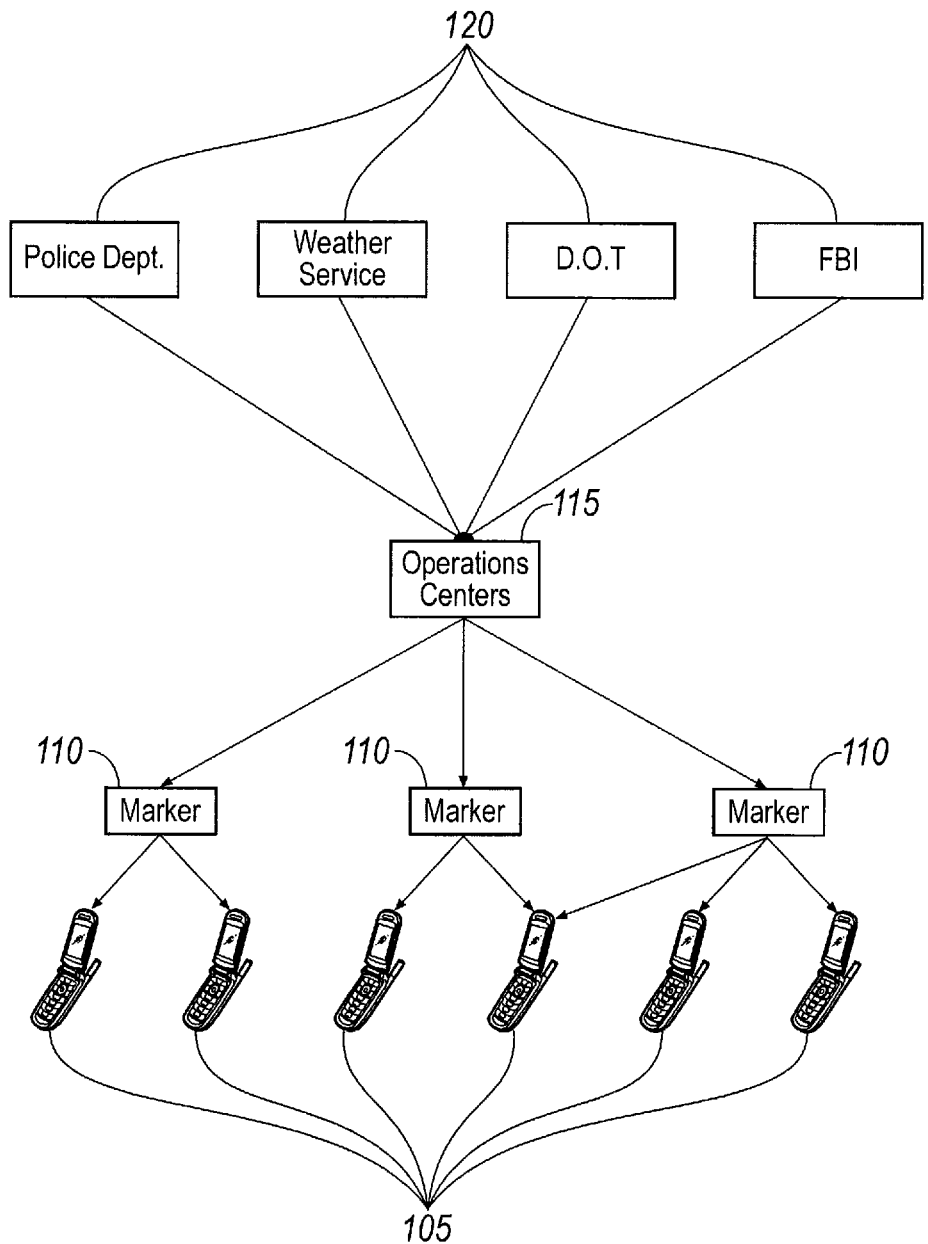
FIG. 3 illustrates an exemplary system for transmitting a plurality of messages.

An exemplary system includes a user device configured to receive messages from a local marker. The messages are regulated by an operation center and are sent by various public service entities to the operation center, which in turn distributes the messages to corresponding markers. The markers then distribute the messages to user devices located within the marker range associated with that marker to inform the public of events or alerts that may affect the safety or wellbeing of the public. The messages transmitted by the markers avoid the need for conventional signs or broadcasts informing users of matters of widespread potential interest such as those alerts involving hazards or conditions.

The system described herein may take many different forms and include multiple and/or alternate components and facilities. While an illustrative system 100 is shown in FIG. 1, the exemplary components illustrated in FIG. 1 are not intended to be limiting. Indeed, additional or alternative components and/or implementations may be used.

As illustrated in FIG. 1, the system 100 includes a user device 105, a marker 110, an operations center 115, and a public service entity 120. Messages, information, and data may be transmitted and received by each of the user device 105, marker 110, operations center, 115 and public service entity 120 using wireless and/or wired networks including any of a wireless network, wireless Internet Protocol (IP), land-line communication network such as public switched telephone network (PSTN), cable lines, telephone lines, optical networks, among others.

The user device 105 may be any type of device capable of receiving a signal. For example, the signal may be any type of electronic signal such as a digital or analog signal. The user device 105 is configured to receive, store, transmit, display and/or play, and purge messages. For example, the user device 105 may be a laptop computer, mobile telephone or smartphone, GPS device, PDA, e-Book reader, among others. The user device 105 may also be located and installed within a vehicle. For example, the user device 105 may be included as part of a satellite radio or GPS system installed within a vehicle. The user device 105 may be included in the vehicle separate from these systems as well. The user device 105 may also be an adaptor configured to attach to any one of the above devices and facilitate receiving the messages transmitted by the marker 110.

The user device 105 is configured to receive messages from the marker 110 in response to the device 105 entering the respective marker range. The device 105, in turn, may store and communicate the message to a user. The device 105 may communicate the message by displaying the message via a visual format on a display screen such as a Liquid Crystal Display (LCD). The message may also contain pictorial displays such as certain warning signs, or graphics commonly associated with certain types of alerts. For example, if the alert is a traffic alert, then the pictorial display may include a traffic sign indicating construction. Further, if the alert is a weather alert, the pictorial display may include a thunder cloud or tornado symbol. The user device 105 may also be configured to receive and communicate messages in other formats such as audio formats. These audio formats may include messages similar to those transmitted over conventional radio stations. The audio messages may be played through speakers associated with a specific user device 105. For example, in situations where the user device 105 is located within a vehicle, the alert may be played through the speakers of the vehicle.

Where a message is an audio message, the message may be played in a 'voice over' context wherein despite the speakers being in use. In this event, the message may cause the current content to be muted while the message is played. For example, if satellite radio is being transmitted through the speakers of a vehicle, the radio, under normal circumstances, will not be interrupted to transmit a public service alert. However, the user device 105 described herein will allow for the current content being transmitted by the speakers to be temporarily interrupted to in order to play the message. The same function is available on handheld user devices 105. Music being played on an MP3 player may be temporarily interrupted by the audio message. In some instances it may be necessary for the user device 105 to include an 'override function.' For example, if a compact disc (CD) player of a vehicle is in use, an incoming message may prompt the override function and mute any audio being played by the CD player while the message is being played.

Likewise, messages in visual formats may also interrupt current content to be displayed on the user device 105. For instance, if the user device 105 is displaying a type of video content on the device 105, the message may temporarily interrupt the content and be displayed on the device 105. Conversely, the message may be displayed concurrently with the current content. For example, the message may include a text alert that scrolls across the bottom of the display, without interrupting the current content.

While messages may be communicated to the user in formats such as those based on vision or sound, it is also possible for the messages to be conveyed in multiple formats such as an audio-visual format. For instance, the message may simultaneously be displayed on the display of the user device 105, as well as be transmitted via an audio feed through the speakers associated with the device 105. This could be advantageous in the event that the volume of the speakers is turned to an inaudible level, or if the user is too distracted by surrounding circumstances to view the display of the user device 105. In another example, different aspects of the message may be conveyed via a visual format and audio format. For instance, an audio format may present general information about an upcoming tornado while the visual format may display a map of potentially effected regions. In another example, a crime alert being transmitted via audio format may convey an alert about an escaped prisoner while the visual format may display a photo of the subject. Further, the visual display may display the content of the message in whole or in part. For example, the message may include a text alert that scrolls across the display, as opposed to the message being displayed in its entirety.

The user device 105 may also be configured to transmit information to the markers 110. This information may include registration information, identification information, location information, previously received messages, or even time stamps of when the user device entered a respective marker range. This information may be stored locally on the user device 105 and transmitted to the marker 110 upon entering the marker range. In an example, user devices 105 may be required to register with the operations center 115 to receive messages from the markers 110. In response to registering with the operation center 115, the user device 105 may be allocated a verification pin or other identification information recognizable by the markers 110. Information transmitted to the markers 110 may be used by the marker 110 to generate a user device database described herein and determine which messages to transmit to the user device 105, as described herein.

The messages received by the user device 105 may include events such as weather alerts and warnings, amber alerts for missing children, silver alerts for missing senior citizens, crime alerts, traffic delays and closures, among others. Crime alerts may include information regarding escaped convicts, wanted persons, or police situations.

A user may also have the ability to personalize his or her message settings through customization settings 125. Customization settings 125 may be presented through a user interface on the user device 105 and may include parameters 130 for customizing treatment of incoming messages from marker 110. Specifically, a user may choose which messages the user device 105 displays or plays. For example, a user may only be interested in traffic and weather alerts and may only wish to interrupt current content on the device 105 for such types of messages. Further, a user in a rural area my wish to only receive police and weather alerts and completely block any traffic alerts from being communicated by the device. These user settings may be implemented on the user device 105. For example, the user options may be displayed and manipulated on the display of the user device 105 using a user interface, as shown in FIG. 1 by way of example. The user device 105 may receive messages, and based on the user settings, decline to display or play the messages. The user device 105 may also transmit the user settings to the marker 110 and prevent such unwanted messages from being sent to the device 105.

Other parameters 130 that may be included in the customization settings 125 may be volume, and backlight display preferences, among other user settings. The user device 105 may also be configured to implement an ignore option. Thus, much like an incoming phone call, the user may choose to 'ignore' the incoming message. Other options may be included such as a repeat option or a save option. Parameters 130 may also include hyperlinks to additional display screens including further customization options, an example of which is described herein with respect to FIG. 9.

The marker 110 is a device capable of receiving messages from the operations center 115 and distributing the messages to user devices 105 located within a corresponding marker range. The marker 110 generally includes one or more computer systems that facilitate receiving, storing, transmitting, and purging messages. The marker 110 may be a fixed structure and include a marker range. The marker range may include any geographical radius, but is likely more local than current cell phone tower ranges. The marker 110 targets user devices 105 found within the respective marker range to communicate public service messages to those members of the public which may be affected by certain conditions or events in the region. The marker range may be determined by the marker 110 itself based on the signal strength of the marker. The operations center 115 may also establish a defined marker range for a specific marker 110. For example, markers 110 located in an urban or densely populated area may have a smaller range in order to transmit messages more locally while a marker 110 located in a rural area may have a larger range. The marker 110 may detect a user device 105 when it enters the marker range by receiving a signal from the user device 105. Additionally, the marker 110 may detect a user device 105 by utilizing GPS information within the marker 110 or the user device 105. The marker range is described in more detail herein.

While each marker 110 likely remains located at a single geographical location, the marker 110 may be relocated and reconfigured for flexibility. For example, if a marker is located close to a highway in an effort to convey messages containing traffic alerts to the public, and the highway is closed for any amount of time, the marker may be relocated to a new location in order to more efficiently convey messages surrounding a highway in actual use.

Marker 110 generally includes a receiver for receiving messages from the operations center 115, a message database for queuing and storing incoming messages, and a transmitter for transmitting the queued messages to the user devices 105 in response to the user device entering the respective marker ranges. The marker 110 may also be configured to receive information from the user device 105, as described herein. Additionally, the marker 110 may be configured to generate a database of user device 105. The database may include information about a specific user device as described herein. As described, messages may have a standard message format promulgated by the operations center 115 and sent to the marker 110. The markers 110 may be capable of transmitting both audio and visual messages. Messages may also be tagged as "new" as they are received from the operations center 115. Likewise, once a specific message has been sent to a specific device 105, the message may be tagged as "old," or "sent" with respect to that device 105. This allows a user device 105 to only receive "new" messages, and avoid receiving duplicate messages. Specific examples of marker operations are shown below with respect to FIGS. 6-8.

A marker 110 may also validate or recognized a user device 105 entering the respective marker range. A marker 110 may receive device information from the device 105 upon the device 105 entering the respective marker range. A marker 110 may store user device information in a user device database and be capable of restricting message transmission to only authorized user devices 105. For example, user devices 105 may be required to be registered with the operations center 115 in order to receive messages from the markers 110. This may also require certain fees to be paid. In response to the registration with the operation center 115, the user device 105 may be allocated a verification pin or other identification information recognizable by the markers 110.

The operations center 115 facilitates sending messages from any of a plurality of public service entities 120 to any of a plurality of markers 110. The operations center 115 may include a computer system capable of organizing incoming messages from the public service entities 120. The operations center 115 may also include at least one operator for facilitating the organization as well. The operations center 115 may verify that the message was received from a validated source or a recognized public service entity 120. For example, each public service entity 120 may be required to register with the operations center 115. Each entity 120 may be given a pin number or pass code by which the operations center 115 may recognize the entities 120. The entities 120 may be recognized by other means such as how the message is sent to the operations center 115. For example, the entities 120 may be verified by their IP address, or an email address used to send the message.

The operations center 115 may receive messages from the public service entities 120 in a variety of ways. For example, the message may be transmitted by a wireless network, facsimile, phone call, email, and so forth. The message may be received in a format recognized by the operations center 115, or the operations center may convert the message into a preferred format. For example, the message may be transmitted wirelessly in a standard format recognized by the operations center 115 (e.g. a .dat file). However, the message may also be transmitted using any of the above examples. In many of these examples, the message would not be transmitted in the standard format and some manipulation by the operations center 115 of the message may occur. For example, the operations center 115 may receive an email containing a message. The operations center 115 may automatically convert the information contained in the email into the standard message format. Conversely, the email may contain a .dat attachment or other recognized standard format, and thus no conversion by the operations center 115 would be necessary. The email may also contain unrecognized message formats such as .doc, .pfd, .jpg, and so on. In this event, the operations center 115 may be capable of automatically converting the attachment to the standard format.

Moreover, a message may be received via a telephone call, wherein the public service entity places a call to the operator of the operations center 115 to convey the message. The operator may then manually create a message in the standard format. Conversely, the operations center 115 may implement an automated phone system wherein by asking specific questions to the public service entity 120, the phone system may build a message in standard format. For example, the phone system may ask the public service entity 120 to "please press '1' if this message includes a weather alert and please press '2' if this message includes a crime alert." The telephone system may also implement a voice recognition system to format the message. In yet another example, if the message is received via facsimile, the operator may again create a message in the standard format from the fax. The public service entities 120 may also use a standard form supplied by the operations center 115 in creating the message.

The operations center 115 may also verify, upon receiving the message from the public service entity 120, that all necessary message data is included in the message. Examples of this data are discussed with respect to FIG. 2 and described herein. The operations center 115 may confirm that the message includes all necessary message data 200 by implementing an automated program on the computer system. The operations center 115 may also implement a manual check to be performed by the operator. The verification of the message data may depend on the format of the message and how the message is received by the operations center 115. For example, if the message is received by the operations center from the public service entity 120 in the standard format, or if the operations center 115 has subsequently converted the message to the standard format the operations center 120 may simply run an automated program to verify that the necessary information is included in the message. The operations center 115 may also receive the message via a phone call. In this event, the operator may manually create a message using the standard format. The operator may manually verify that the message data is sufficient, or after creating the message in standard format, the operations center 115 may run the automated program to verify the data.

Once the message is in a standard format, the operations center 115 may evaluate the data included in the message. If the message received from the public service entity 120 has missing data, the operations center 115 may decide whether that data is necessary for the conveyance of the message. Necessary data may include message data such as the message content, which includes the message to be conveyed to the user devices 105. Other necessary data may be determined by the operations center 115. The necessary data may vary between the categories of messages. For example, range information may be required for a weather alert and traffic alert, while it is not necessary for an amber or silver alert. If the missing data is not necessary, then the message may be conveyed to the respective markers 110 regardless of the missing data. If the missing data is necessary, then the operations center 115 may either send the message back to the public service entity 120 for further clarification, or the operations center 115 may add the necessary information to the message itself.

The operations center 115 may use information located within the message itself to add necessary information. For example, if a weather alert relating to an upcoming thunder storm is missing certain information, such as purge information, the operations center 115 may select a purge time to include the expected duration of the storm. This information is then passed onto one or more markers 110 for distribution.

Conversely, the operations center 115 may draw on outside sources to fill in the missing data of the message. The operations center 115 may draw on any number of databases to fill in missing information. For example, the operations center 115 may have access to the Department of Transportation's (D.O.T) database or website and may acquire information regarding road closure from the database. The operations center 115 may then use this information to complete the expected duration of the closure, which may have been inadvertently left out of the original message sent from the D.O.T.

The operations center 115 may also use messages previously sent by a public service entity 120 to complete the message data. For example, if a message sent by the weather service including a tornado warning was missing purge information, the operations center 115 could search prior tornado warnings send by the weather service and determine an appropriate purge time based on these prior messages. These previously received messages may be stored in a message database for a defined period of time. As explained, some messages may be missing necessary data that may not be appropriately filled in by the operations center 115 and will be returned to the public service entity 120 for further clarity.

The operations center 115 may also determine which markers 110 are to receive each message. Although range information may be included in the message data as described herein, the operations center 115 may also be configured to transmit certain messages to certain markers based on a number of factors. These factors may include the entity sending the message or the content of the message. For instance, if the message is sent to the operations center 115 by a local public service entity 120, such as a local police department, the operations center 115 may only distribute the message to markers 110 within that county or city associated with the police department.

Further, the operations center 115 may verify that the message is not a duplicate message, or that the message has not previously been sent by the same or another public service entity 120. This may be accomplished by accessing the database containing the previously received messages and comparing the messages in the database with the incoming message from the public service entity 120. The messages may be compared using the message content, a message time stamp, or any other message data that could identify same or similar messages. The operations center 115 may automatically check for duplicate messages or the operator may initiate a check. The operation center may perform a query of the message database using keywords located within the message. If the operations center 115 does detect a duplicate message, the operation center 115 may select one of the two messages to send on to the marker 110, or the messages may be merged to form a single alert. In the event that a message is not conveyed to the marker 110, the operations center 115 may inform the public service entity 120 responsible for the message of the duplicity. In an example, a crime alert sent by the local police department may also be sent by the Federal Bureau of Investigation (FBI). The operations center 115 may select one of the two messages to send on to the marker 110, or the messages may be merged to form a single alert.

The public service entity 120 can be any type of agency or public service which may alert the public of matters of widespread potential interest such as those alerts involving hazards or conditions. For example, the public service entity may be any one of a department of transportation (D.O.T), a law enforcement agency such as a police department or the FBI, the National Weather Service, or any other entity which performs a public service and may use system 100 to convey a message to the public. The messages promulgated by the public service entity 120 may include any number of alerts described herein.

Thus, the public service entity 120 is in communication with the operations center 115 and promulgates a message identifying an event. The operations center is in communication with the marker 110 and sends the message to the marker 110. The marker 110 is in communication with the user device 105 and is configured to send the message to the user device 105 in response to the user device 105 entering the respective marker range. The marker range is discussed in more detail herein.

In general, computing systems and/or devices, such as the user device 105, marker 110, and operations center 115, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

FIG. 2 illustrates message data 200, or information, included in an illustrative message as promulgated by the public service entity 120 and received by the operations center 115. The message data may include a message header 205, message type 210, message priority 215, message content 220, purge information 225, and range information 230. The header 205 includes the basic title of the message. For example, the header 205 may read "Severe Thunderstorm Warning for Oakland County." The message type 210 may include just that, the type or category of message that is being conveyed, such as a weather alert, an amber alert, silver alert, traffic alert, and so forth.

The message priority 215 includes information regarding the urgency of the message. Where multiple messages are being sent to the operations center 115, the operations center 115 may default to sending messages to the markers 110 as they are received. Messages may be delivered to the markers 110 on a first come first serve basis. However, it is likely that several of the messages may be conflicting messages. For example, two messages from two different public service entities 120 may be sent to the operations center 115 at or about the same time. In turn, the markers may receive the messages at the same time. The user device 105, although likely capable of receiving multiple messages, may not be capable of playing or displaying the messages concurrently. For this reason messages may include priority information. The priority information 225 informs the markers 110 and the user devices 105 which message should be displayed, and in what order.

For example, a weather alert, such as a tornado warning, may have a high priority level, whereas a traffic alert conveying construction information may have a low priority level. Priority levels may be designated by numerals, such as 1, 2, and 3, or the priority levels may also be designated by "low," "medium," or "high" labels. Thus, if two messages, one having a "high" priority and one having a "low" priority, are conflicting, the "high" priority message is sent to the marker 110 to be displayed or played by the user device 105 prior to the "low" priority message. In the given example, the weather alert would supersede the traffic alert. The operations center 115 may also implement default priorities in the event that a message is either missing message priority 215, or is in conflict with another message. For example, weather alerts may automatically be given a 'high' priority, while traffic alerts may be given a 'low' or 'medium' priority. It is also possible to have sub-categories within the message type 210, each given a different priority. For example, traffic alerts may include construction alerts and accident alerts. Accident alerts, which may cause more traffic congestion than routine construction, may be given a 'medium' priority, while the later may be given a 'low' priority.

In the event that two messages are received by the operations center 115 at or about the same time with the same priority, the priority defaults may cure the conflict. For instance, if a weather alert and a crime alert are both received simultaneously, and both are given a 'high' priority, if the weather alert has a default priority of 'high', with the crime alert having a default priority of 'medium', then the traffic alert will supersede the crime alert. The operations center 115 may also arrange default priority on a strict first come first serve basis and cure any conflicts in this manner.

The message content 220 includes the actual information sent to the marker 110 to eventually be conveyed to the user device 105. As mentioned, the message content 220 may be in several formats including visual formats including text and other pictorial formats, as well as audio formats. The message content 220 is the part of the message actually displayed or played by the user device 105 to inform the user of the alert.

The exemplary message also includes purge information 225. This information informs the operations center 115 how long the message should be stored in the marker 110. For instance, if the message contains a weather alert, the message may be purged after six (6) hours, or until the storm is likely to pass. In another example, if the message includes a traffic alert about ongoing construction, the message may not purge for several weeks, or until the estimated completion of the construction. In any event, the purge information 225 may be updated by the public service entity 120 at any time. The public service entity 120 may also resend the message in the event that the message needs to be extended past the initial purge time. In the event that the message is missing the purge information 225, the operations center 115 may insert the purge information 225 or return it to the respective public service entity 120. As described herein, the operations center 115 may use a message database to fill in missing message data; this includes missing purge information 225. The operations center 115 may also implement default purge information. The default purge information may be a general amount of time for all messages, or defaults may be established based on the message type 210. For example, weather alerts may have a default purge time of six (6) hours, while amber alerts may have a default purge time of 24 hours. The operator may also manually input purge information 225.

The message may also include range information 230. The range information 230 corresponds to an event identified by the message and may specifically indicate which markers 110 are to receive and distribute the message. The range information 230 may also simply indicate a geographical region for which the message should be transmitted, and defer to the operations center 115 to select the appropriate markers 110. Messages may be sent to a single marker 110 for a local message or several markers 110 to cover a larger region. For example, if the message is a traffic alert pertaining to an accident, only drivers along or around that route may be interested in the message. Thus, only the marker 110 located near the accident would transmit the message. However, if the message includes a weather alert, and thus may affect a larger geographical region, then several markers 110 may be selected to transmit the message.

As explained, the range information 230 included in the message transmitted from the public service entity 120 may determine which markers 110 receive a specific message from the operations center 115. Further, the operations center 115 may also be capable of determining which markers 110 receive a specific message based on the geographical region established by the range information 230. The operations center 115 may determine which markers cover the geographical region and transmit the message to those markers 110 accordingly. The user device 105 may also include GPS information which may be compared to the range information 230. If the user device 105 is within the marker range, or the geographic area established by the range information 230, then the device 105 may receive the message from the respective marker.

FIG. 3 illustrates a further example of the system 100 of FIG. 1, specifically showing a plurality of public service entities 120, each sending messages to the operations center 115 and a plurality of markers 110 receiving those messages from the operations center 115. In this exemplary configuration, several user devices 105 are capable of receiving multiple messages from several different public service entities 120. Thus, it is possible for a user device 105 to receive messages from more than one marker 110. This is explained in more detail below with respect to FIG. 5.

Figure 4:
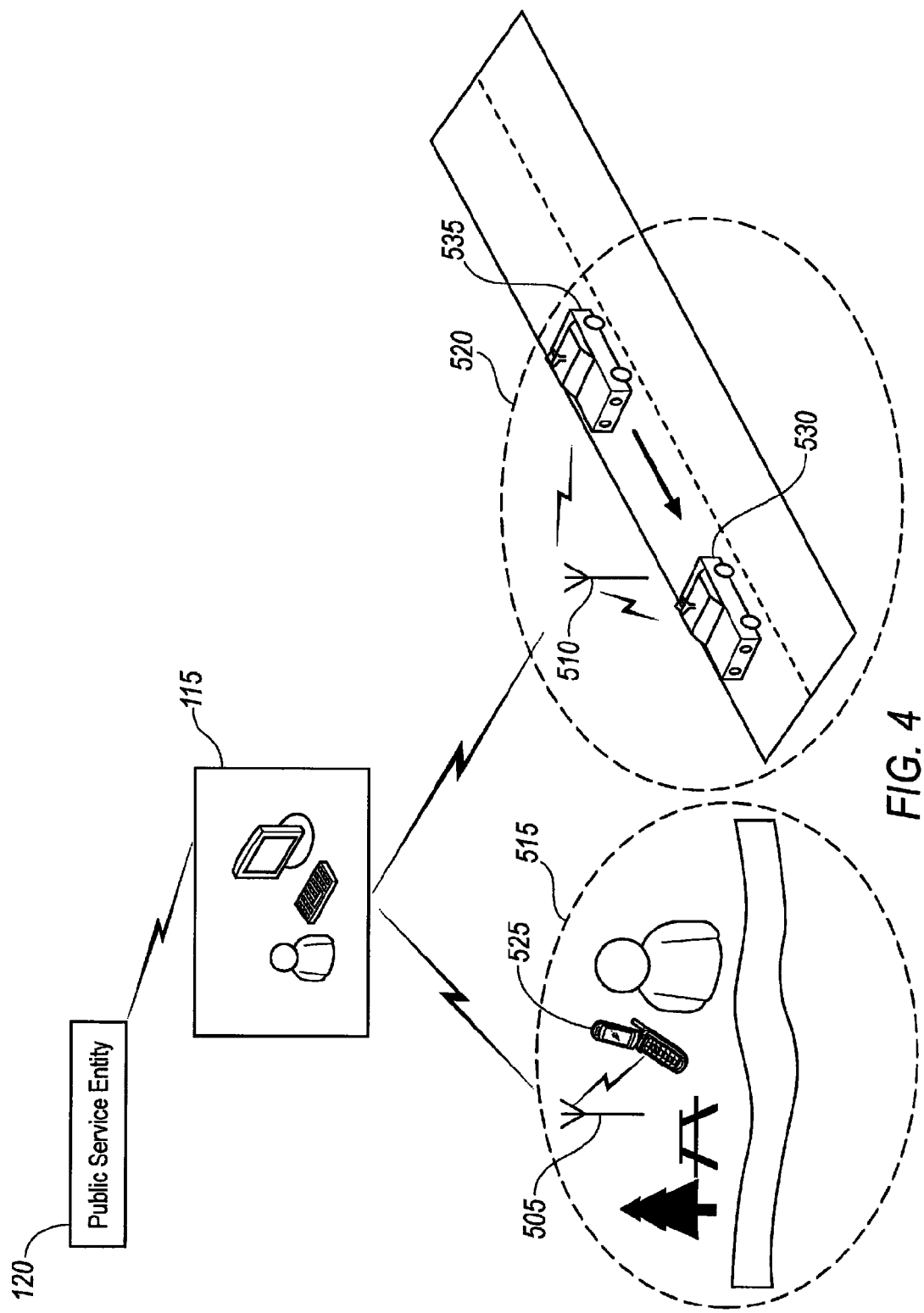
FIG. 4 illustrates an exemplary diagram of the system transmitting messages to multiple user devices.

FIG. 4 illustrates an exemplary implementation of system 100 wherein a message is sent from a public service entity 120 to the operations center 115, which in turn sends the message to two respective markers 505, 510. Each of the markers 505, 510 are associated with a marker range 515, 520 and each distribute messages to the user devices 525, 530, 535 within that range 515, 520. The markers include a first marker 505 and a second marker 510. The first marker 505 transmits the message to a first user device 525. The second marker 510 transmits the message to a second user device 530 and a third user device 535, each of which are located in a vehicle. User devices 530 and 535 eliminate the need for conventional digital signs to alert the drivers of an event. This can prevent traffic backups and decrease driver distraction.

Figure 5:
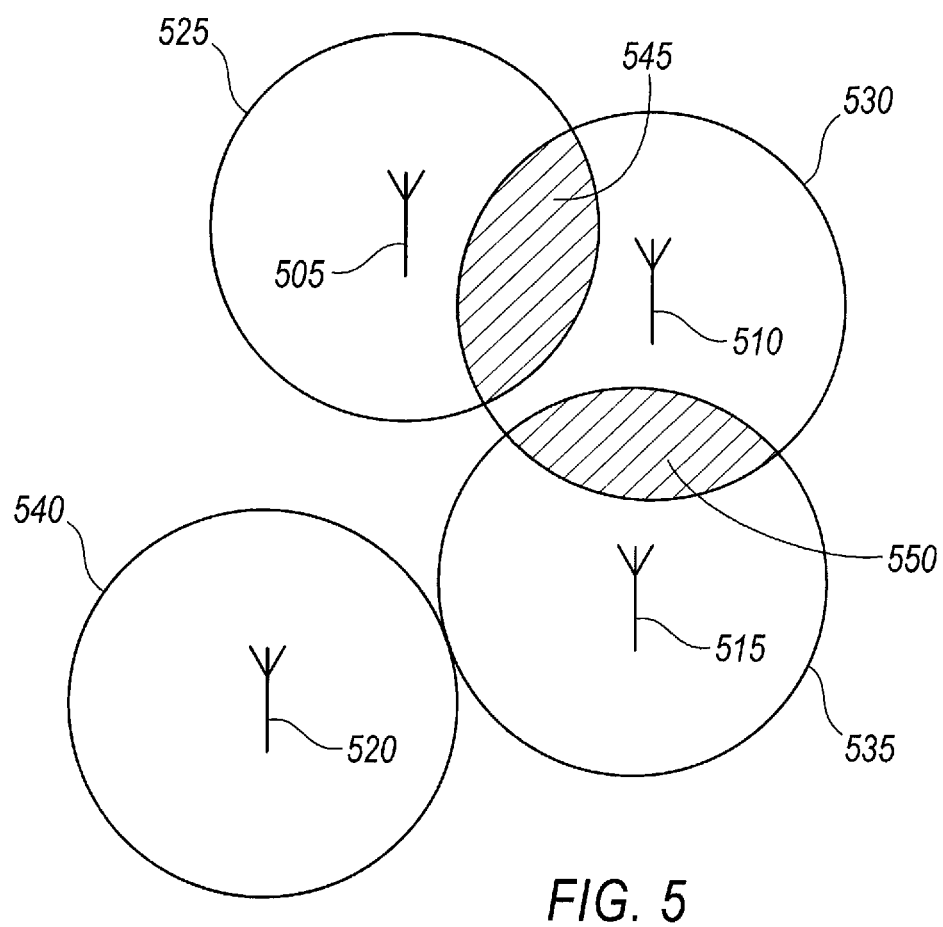
FIG. 5 illustrates an exemplary diagram of marker ranges.

FIG. 5 illustrates an exemplary implementation of system 100 wherein several markers 505, 510, 515, and 520 are associated with several marker ranges 525, 530, 535, and 540, respectively. For example, marker 505 will transmit messages to user devices 105 located within range 525. As the figure indicates, several ranges may overlap each other. These range overlaps 545, 550 may be very likely in urban areas where there is a higher population and thus increased traffic. On the other hand, markers 110 in rural areas are less likely to have overlapping ranges, such as marker 540. Further, user devices 105 may receive messages from more than one marker 110, depending on the location of the user device 105. Users located in the range overlaps 545, 550 may have a sufficient interest in receiving messages stored by both markers. For example, marker 505 may receive and store a message regarding a tornado warning for the respective marker range 525, while marker 510 may receive and store a message regarding a flood watch warning for the respective marker range 530. If a user is located in the range overlap 545, the user could potentially be affected by both weather alerts, and thus have a strong interest in receiving both messages.

In the event that a user device 105 is located within the range overlap 545 and markers 505 and 510 are to transmit the same message, the user device 105 may either communicate with the markers to prevent a duplicate message from being received, or filter the duplicate message so that only one of the messages is displayed or played. This is discussed in greater detail below with respect to FIG. 6.

Figure 6:
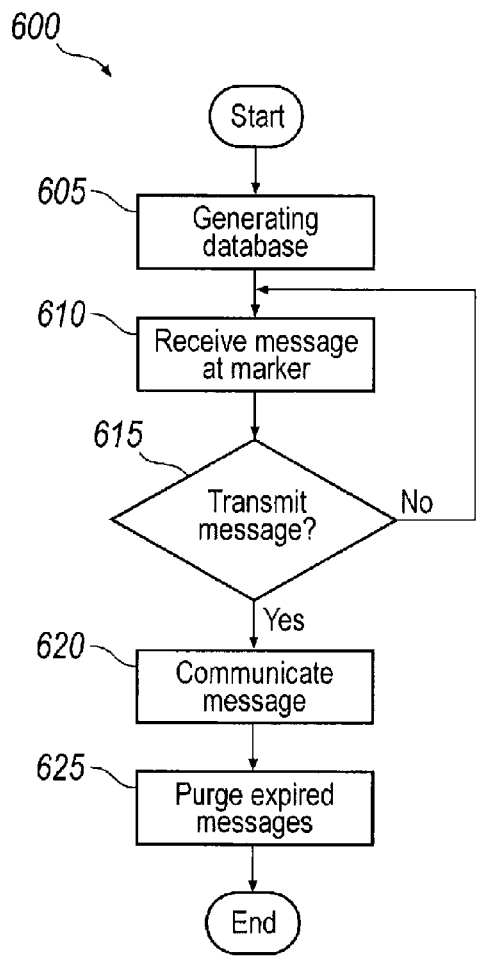
FIG. 6 illustrates an exemplary method for transmitting messages from a marker to a user device.

FIG. 6 illustrates an exemplary process 600 that may be performed by one or more of the elements of the system 100 previously described. Block 605 includes generating a database of user devices 105 located within the marker range of a marker 110. As described, the database may include information about specific user devices 105 including the identity of a user device, the location of a user device, a time stamp identifying when the user device entered the marker range, previously received messages, as well as subscription information and customization setting information. The user device 105 may store this information locally and transmit all or some of the information to the marker 110 upon entering the respective marker range. The user device 105 may also transmit the information at predetermined intervals. The marker 110 may in turn generate a database using this transmitted information. The marker 110 may retain user device information even after the user device 105 has left the respective marker range. Although shown in FIG. 6, process 600 does not require generating a database of user device 105, and may be implemented without block 605. Process 600 proceeds to block 610.

Block 610 includes receiving a message at the marker 110 from the operations center 115. As described herein, the marker 110 stores or queues the messages for a predetermined purge time. Process 600 proceeds to block 615.

Block 615 includes determining if the message is to be transmitted from the marker 110 to the user device 105. This determination may include determining whether the message has previously been received by the user device 105. This may be determined in a variety of ways. As stated, the database may include information about the user device 105 such as the location of the user device 105 and a device time stamp indicating when the user device 105 entered the respective marker range. The device time stamp may be compared to the time the message was received from the operations center 115 to determine whether the message is "new" and has not been previously transmitted to the user device 105, or whether the message is "old" and has been previously transmitted. Thus, if a message is received by the marker 110 after the user device 105 has already entered the marker range, the message may be a "new" message and may be transmitted to the user device 105. Conversely, if the message was received before the user device 105 entered the marker range, then the user device 105 may have already received the message from the marker 110 upon entering the marker range. Additionally, at any time while the device 105 is located within the marker range, any message transmitted to the marker 110 during that time may be automatically transmitted to the device. If there are "new" messages, process 600 proceeds to block 620. If there whether there are no new messages to be transmitted, or all of the messages are "old", process 600 proceeds to block 610.

Block 620 includes communicating the message via the user device 105 when a message had been determined to be "new". The message may be communicated by displaying it on the display of the user device, playing the message through the speakers of the device, or using some other appropriate format. Process 600 proceeds to block 625.

Block 625 includes purging or deleting expired messages. A message may be deleted from the marker 110 based on the purge information 225 of the message, as described herein.

Figure 7:
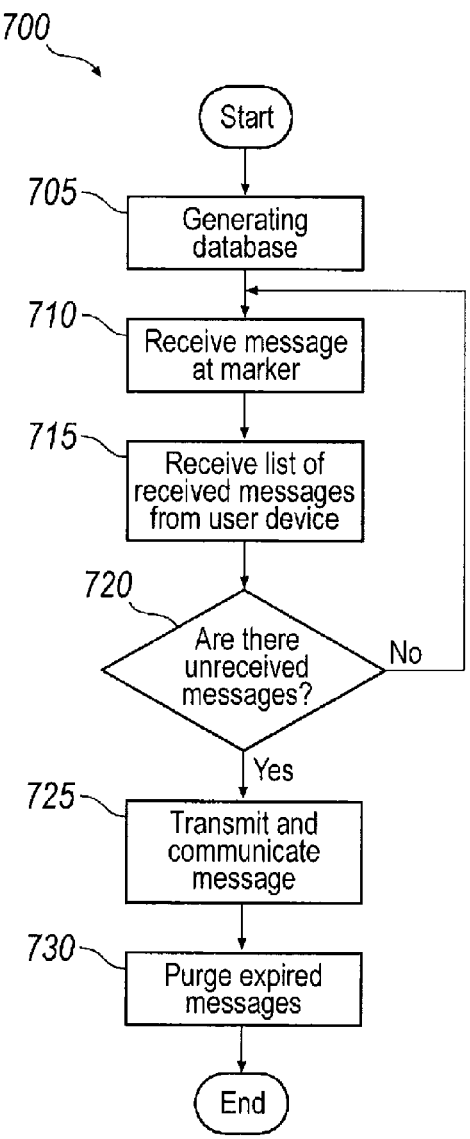
FIG. 7 illustrates another exemplary method for transmitting messages from a marker to a user device.

FIG. 7 illustrates an exemplary process 700 that may be performed by one or more of the elements of the system 100 previously described. Block 705 includes generating a database of user devices 105 located within the marker range of a marker 110 similar to the process described in FIG. 6. Process 700 proceeds to block 710. Block 710 includes receiving a message at the marker 110 from the operations center 115. Process 700 proceeds to block 715.

Block 715 includes receiving a list of previously received messages from the user device 105. As explained, the user device may be configured to store previously received messages and transmit this list to the marker 110. This list may be transmitted upon the user device 105 entering the respective marker range, or at predetermined time intervals. Process 700 proceeds to block 720.

Block 720 includes determining whether there are messages stored within the marker 110 that have not been received by the user device 105. This may be determined by comparing the messages previously sent to the user device 105 with the messages currently stored in the marker 110. To prevent duplicate messages from being communicated, the marker 110 may only transmit messages that are currently queued, but not found in the list supplied by the user device 105. If there are no un-received messages, process 700 proceeds to block 710. If there are un-received messages then process 700 proceeds to block 720.

Block 725 includes transmitting the message to the user device 105 and communicating the message via the user device 105. The message may be communication by displaying the message on the display of the user device, playing the message through the speakers of the device, or both. Process 700 proceeds to block 730.

Block 730 includes purging or deleting expired messages. A message may be deleted from the marker 110 based on the purge information 225 of the message, as described herein.

Figure 8:
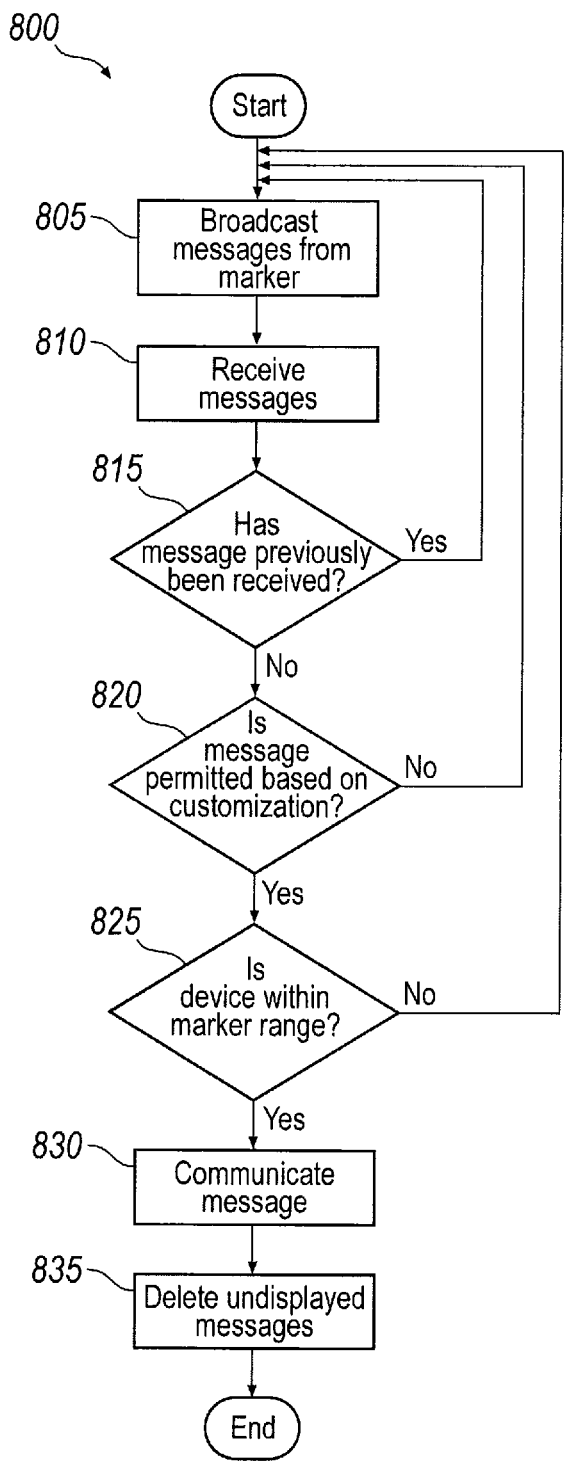
FIG. 8 illustrates another exemplary method for transmitting messages from a marker to a user device.

FIG. 8 illustrates an exemplary process 800 that may be performed by one or more of the elements of the system 100 previously described. Block 805 includes broadcasting queued messages from marker 110. Process 800 proceeds to block 810. Block 810 includes receiving the messages broadcast by the marker 110 at the user device 105. The user device 105 receives all the messages currently stored by the marker 110. Process 800 proceeds to block 815.

Block 815 includes determining whether to communicate each message received by the user device 105 based on previously received messages. This may include searching through the database of stored messages on the device 105 and comparing the stored messages with the messages received from the marker 110. If the device does not find each received message among the stored messages, then the message may be a "new" message, and thus be communicated via the user device 105. Process 800 proceeds to block 820. If there are no "new" messages, or if all of the messages received from the marker 110 have already been communicated previously, then process 800 proceeds to block 805.

Block 820 includes determining whether the device is to communicate a message based on the customization settings 125. As described previously, customization settings 125 may limit the messages that are communicated via the user device 105. Customization settings 125 may limit communication of a message to certain categories of messages. For example, a user may only select to receive messages regarding weather alerts, and not to receive any traffic. Thus, if a message is "new" and if the message is a weather alert, then the message may be communicated. Process 800 proceeds to block 825. If the message is not within the customization settings 125, then process 800 proceeds to block 805.

Block 825 includes determining whether the device is to communicate a specific message based on the location of the user device 105. For example, the user device 105 may only receive a message if the user device 105 is within the marker range. The marker 110 may detect the user device 105 when it enters the marker range. The user device 105 may also transmit information to the marker 110. For example, the user device 105 may transmit GPS information to the marker. The marker 110 may in turn compared the GPS information to the range information 230 of the message. If the user device 105 is within the marker range then the device 105 may receive the message. If the message is to be displayed in response to any of the above determinations, process 800 proceeds to block 830. If the message is not to be displayed or played, process 800 proceeds to block 805.

Blocks 815-825 include examples by which process 800 may determined whether or not to communicate a message via the user device 105. Blocks 815-825 may be implemented alone, in any combination, and in any order.

Block 830 includes communicating the messages via the user device 105. As stated previously, the message may be displayed on the display of the user device 105, played via the speakers of the user device 105, or both. Process 800 proceeds to block 835.

Block 835 includes deleting messages within the user device 105 that have not, and will not be displayed. For example, if the message falls into a category that is not displayed based on customization settings 125, or if the user device 105 is not within the geographic location established by the marker to receive the message, the message may be deleted from the user device 105. Conversely, messages that have been received by the device 105 and played, displayed or otherwise communicated may be stored in the database of received messages.

Processes 600, 700, and 800 may be performed for multiple markers 110 in the event that the user device 105 is located within a marker overlap, as shown by the example in FIG. 5. Thus, processes 600 and 700 may prevent the user device 105 from receiving the same message from two different markers 110.

Figure 9:
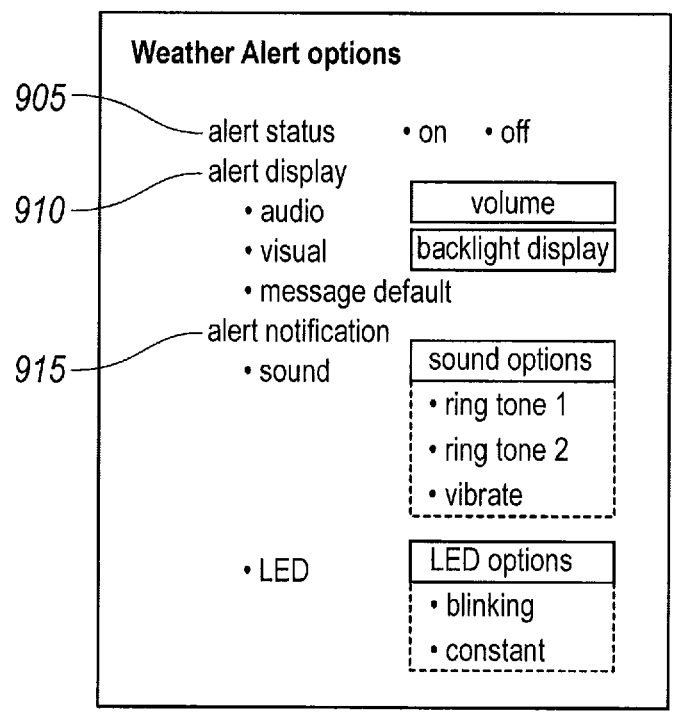
FIG. 9 illustrates an exemplary user interface for implementing message customization settings.

FIG. 9 illustrates an exemplary display screen including customization options for receiving a weather alert accessible via a hyperlink within customization setting 125. The display may include customization options such as an alert status 905, alert display 910, and alert notification 915. The alert status 905 may include an 'on' and 'off' option that, for instance, allows the user to select whether or not the user will receive this specific category of alert. The alert display 910 may also include options to receive the message in an audio format, a visual format, or both formats. For example, if a message may be transmitted in either format, the user may select which of the two formats, including both formats, to receive the message. Further, the user may select to receive the message in its default format. Thus, if the message is only transmitted from the marker 110 as an audio message, then the message would only be played as such. However, if the message is transmitted in both audio and visual formats, the user may elect to only receive one format over the other. The user may also select to receive both formats, as described herein. The customization options also include a volume option, allowing the device to play a message at a certain volume setting, and a backlight display, allowing the device to display a message at a certain backlight setting.

The customization options may also include an alert notification 915. This may include selecting a sound alert to be played through the speakers of the user device 105 upon receiving an incoming message. The sound options may include a plurality of ring tones as well as a vibrate option. The alert notification 915 may also include a Light Emitting Diode (LED) alert. An LED may be included in the user device 105 and may indicate that a new message has been received from a marker 110, or that a new message is about to be communicated via the user device 105. LED options may include selecting a blinking LED or a constant LED, among others. Both sound and LED options may be selected to indicate that a new message is to be communicated by the user device 105. These customization options may be applied generally to all messages through the customization settings 125, but may also be customized for each category of message, as exemplified by FIG. 9 and described above.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
a marker having a marker range and configured to receive a message, wherein said message identifies an event associated with said marker range, wherein said marker range includes a geographic radius from said marker; and
a device configured to receive said message from said marker in response to said device entering said marker range and wherein said device is configured to determine whether to communicate said message to a user based at least in part on whether said message was previously received by said device at least using a comparison of message content.

2. A system as set forth in claim 1, wherein said device determines whether to communicate said message in response to said device having Global Positioning Satellite (GPS) information that identifies a location within said marker range.

3. A system as set forth in claim 1, wherein said message is one of a plurality of stored messages in said marker, and
said marker determines whether to communicate another a second message to said device in response to a comparison of said second message with said plurality of stored messages.

4. A system as set forth in claim 1, wherein said device determines whether to communicate a second message to the user in response to verifying that said second message from said marker is not a duplicate message.

5. A system as set forth in claim 1, wherein said device determines whether to communicate said message in response to a customization setting input by a user via a user interface,
wherein said message identifies at least one of a plurality of message categories including at least one of a weather alert, an amber alert, a silver alert, a crime alert, and a traffic alert,
wherein said customization setting identifies at least one of said message categories, and
wherein said message is communicated in response to said message identifying at least one of said message categories of said customization setting.

6. A system as set forth in claim 1, wherein said marker is configured to store said message for a predetermined amount of time before communicating said message to said device.

7. A system as set forth in claim 1, further comprising an operations center configured to receive said message from a service entity and wherein said marker receives said message from said operations center.

8. A system as set forth in claim 1, wherein said message is one of a plurality of messages; and
the system further comprises an operation center based configured to select at least one of the plurality of messages associated with at least the event.

9. A system as set forth in claim 8, wherein said device is configured to receive at least one of said messages from at least one of said markers in response to said device entering said marker range of at least one of the plurality of markers.

10. A system as set forth in claim 8, wherein each of said messages includes one of a set of message priorities and said device is configured to communicate said messages further based on said one message priority.

11. A method, comprising:
sending a message to an operations center, wherein the message identifies an event;
determining a geographical range in which to send the message based on the event;
sending the message from the operations center to at least one marker located within the determined geographical range;
sending the message from the at least one marker to a user device in response to the user device entering the determined geographical range; and
determining, by the user device, whether to communicate the message to a user based at least in part on whether the message was previously received by the device at least using a query of a message database.

12. The method of claim 11, further comprising communicating the message in response to a customization setting at least in part defining treatment of the message from said marker, wherein the customization setting includes at least one user setting at least in part defining at least one message type to be displayed or played on said device.

13. The method of claim 11, further comprising communicating the message in response to the device having Global Positioning Satellite (GPS) information identifying a location of the device within the geographical range from the at least one marker.

14. The method of claim 11, further comprising:
identifying range information within the message corresponding to the event, wherein the range information indicates if the at least one marker is selected by an operations center to receive and distribute the message; and
determining the geographical range from the at least one marker based on the range information included in the message.

15. The method of claim 11, further comprising determining, by the user device, whether to communicate a second message to the user in response to verifying that the another message from the marker is not a duplicate message.

16. The method of claim 11, further comprising:
storing the message in the marker;
receiving at the marker a list of previously received messages from the user device;
determining, by the marker, whether to send the message to the user device by comparing the message stored in the marker with the list of previously received messages stored in the device; and sending the message to the user device if the message is not included in the list of previously received messages.

17. The method of claim 11, further comprising deleting the message from said marker in response to expiration of a predetermined purge time identified by the message.

18. The method of claim 11, further comprising, in response to determining to communicate the message to the user:
- interrupting current content being communicated by the device; and
- communicating the message by the device.

19. A system comprising:
- an operations center configured to receive a plurality of messages, wherein each of said messages includes range information;
- a plurality of markers each having a marker range and configured to receive said messages from said operation center based on said range information of each of said messages, wherein each of said messages identifies an event, wherein said each marker range includes a geographic radius from at least one of the plurality of markers; and
- at least one user device configured to receive at least one of said messages from at least one of said plurality of markers in response to said device entering said marker range of said at least one of the plurality of markers, wherein said event is associated with said marker range and said of said at least one of the plurality of markers is configured to receive device information from said user device;
- wherein said user device is configured to determine whether to communicate said at least one of said messages to a user based at least in part on a customization setting input by a user via a user interface and based at least in part on whether said at least one of said messages was previously received by said user device at least using a comparison of message time of said messages.

20. A system as set forth in claim 1, wherein said geographic radius is smaller than a cell phone tower range radius.

21. A system as set forth in claim 1, wherein said marker range is determined by said marker based on a signal strength of the marker.

22. A system as set forth in claim 1, further comprising an operations center configured to define said marker range to be particular to said marker.

23. A system as set forth in claim 22, wherein said operations center defines said marker range of said marker based in part on a population density.

24. A method as set forth in claim 11, wherein said marker is relocated within the system based on the event from a first location to a second location and wherein the first location is closer to the event than the second location.

25. A system as set forth in claim 8, wherein each of said plurality of messages identifies a different event and includes different range information.

* * * * *